United States Patent [19]

Mullenberg

[11] Patent Number: 4,471,846
[45] Date of Patent: Sep. 18, 1984

[54] CLAMPING ARRANGEMENT

[76] Inventor: Ralph Mullenberg, Im Wiesengrund 6, 4048, Grevenbroich, Fed. Rep. of Germany

[21] Appl. No.: 377,939

[22] Filed: May 13, 1982

[30] Foreign Application Priority Data

May 21, 1981 [DE] Fed. Rep. of Germany ....... 3120224

[51] Int. Cl.³ .................... E21B 10/60; A44B 21/00
[52] U.S. Cl. ................................ 175/422; 24/136 B; 411/75
[58] Field of Search .......... 24/263 R, 263 DB, 263 A, 24/136 B; 411/75, 77, 80; 175/422

[56] References Cited

U.S. PATENT DOCUMENTS

| 730,460 | 6/1903 | Irvine et al. | 24/263 R |
| 1,064,270 | 6/1913 | Willard et al. | 24/263 R |
| 1,659,783 | 2/1928 | Pearce | 24/263 R |
| 2,083,089 | 6/1937 | Rector | 24/263 R |
| 2,260,876 | 10/1941 | Wagner | 24/263 R |
| 2,503,860 | 4/1950 | Williams | 24/263 DB |

FOREIGN PATENT DOCUMENTS

| 1190266 | 3/1964 | Fed. Rep. of Germany . |
| 2017149 | 10/1971 | Fed. Rep. of Germany . |
| 7617275 | 5/1976 | Fed. Rep. of Germany . |
| 1361776 | 4/1964 | France . |

Primary Examiner—Victor N. Sakran
Attorney, Agent, or Firm—Kenyon & Kenyon

[57] ABSTRACT

The clamping arrangement has a pair of elements which are provided with mating conical surfaces in the self locking range. The elements can be axially displaced relative to each other by axial clamping screws for clamping purposes. Auxiliary rings are provided between the elements and have through bores for the clamping screws. With the clamping screws removed, the auxiliary rings can be turned to align a tapped bore in one ring and an abutment surface in the other ring with a clamping screw so that this screw can be used for separating the clamped elements from each other.

8 Claims, 8 Drawing Figures

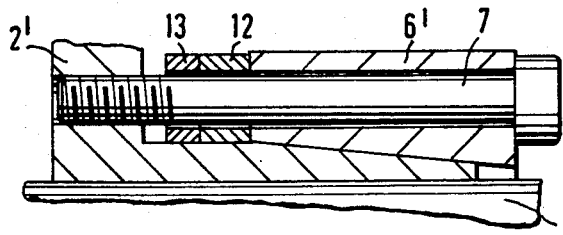
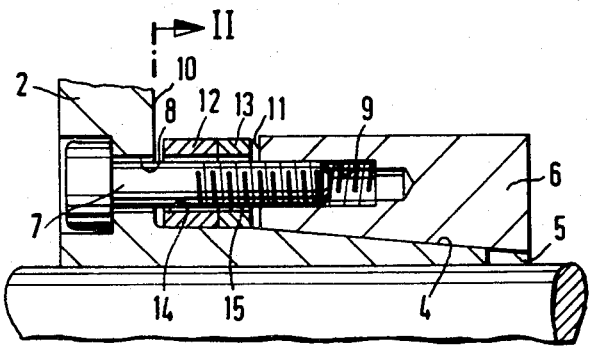
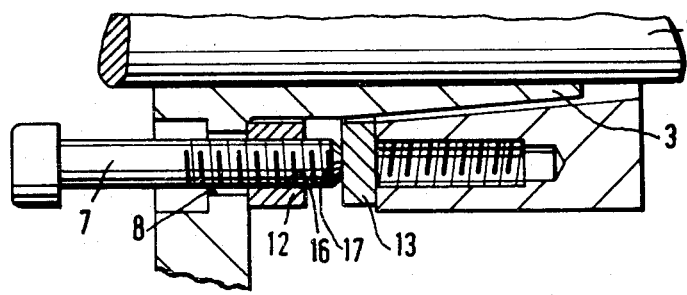
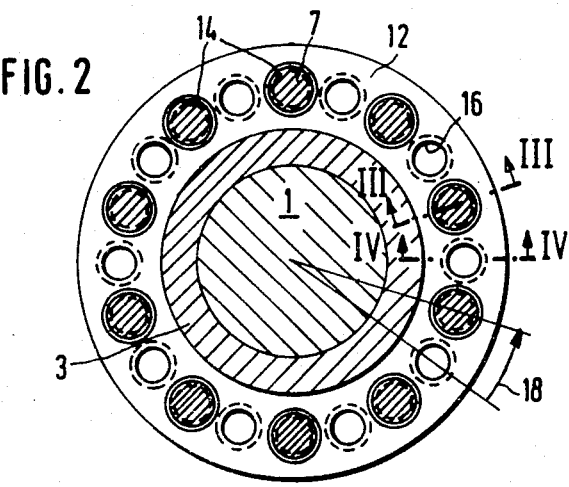
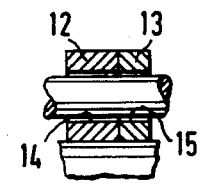
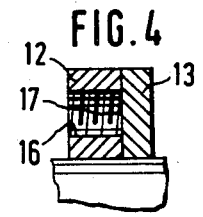

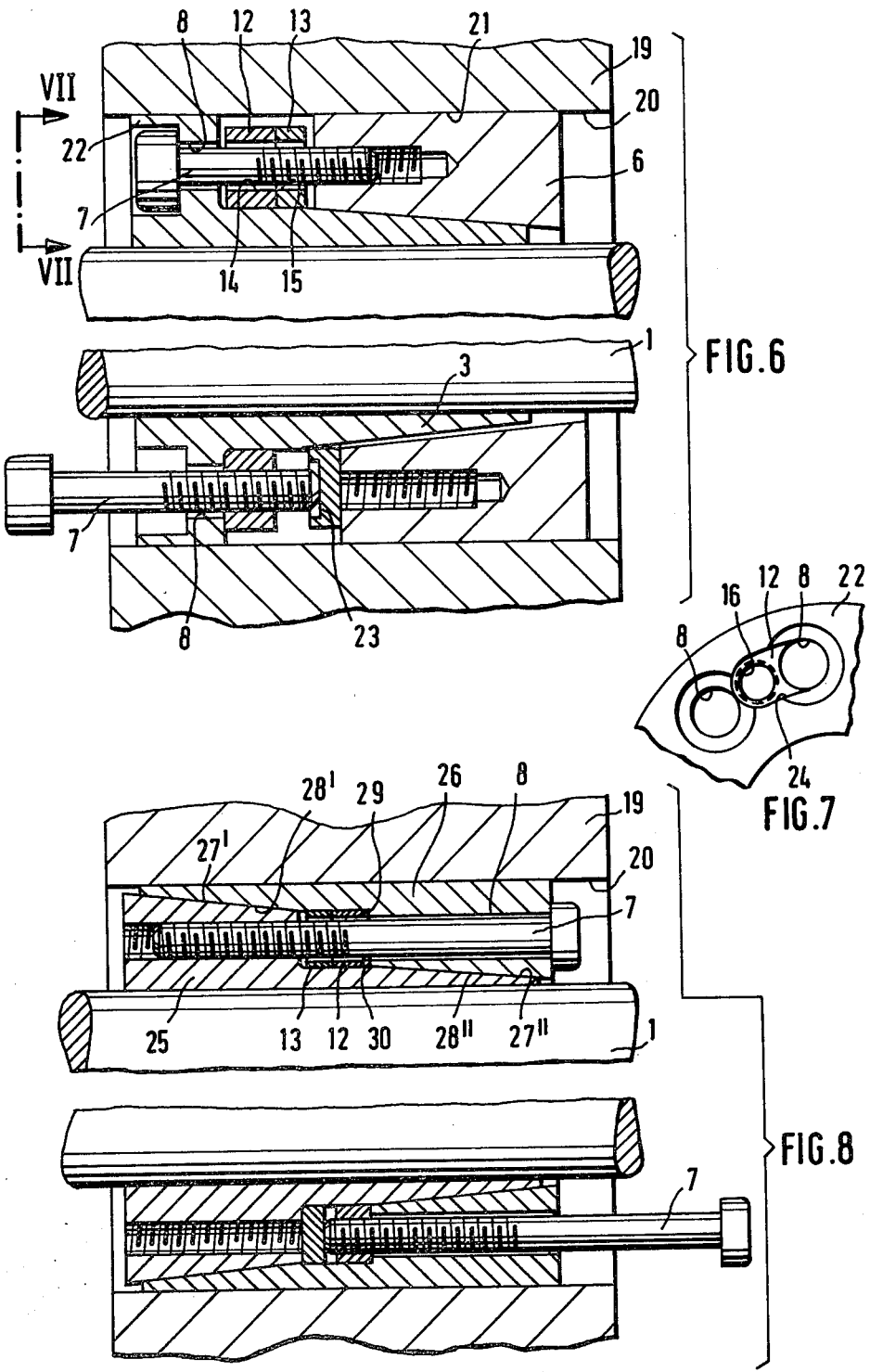

4,471,846

CLAMPING ARRANGEMENT

This invention relates to a clamping arrangement. More particularly, this invention relates to a clamping arrangement for securing two concentrically arranged parts together.

Heretofore, various types of clamping arrangements have been known for securing concentric parts together. For example, German GM No. 76 17 275 describes a double cone clamping arrangement which can be inserted into an annular space between a shaft and a hub bore in order to secure the hub to the shaft. This clamping arrangement includes a double cone ring with two conical hubs which have wall thicknesses which decrease axially outward and a central web which bridges the space between the shaft and the hub bore for centering purposes. In addition, individual conical rings cooperate with the two conical surfaces of the double cone ring and clamping screws pass through holes in one of the conical rings and the web into tapped holes in the other cone ring. These screws serve to draw the cone rings toward each other when tightened.

If the conical surfaces are in a self-locking range which is desirable in order to obtain maximum radial clamping forces, the cone rings do not separate automatically when the clamping screws are loosened. Instead, the cone rings must be separately pushed off from the double cone ring. Normally, in order to carry out such a pushing off operation, two sets of axial pushing-off screws are provided in the clamping arrangement. One of these sets serves for the pushing-off of the front cone set of screws from the double cone ring while the second ring serves for pushing-off the rear cone ring from the double cone ring. Such pushing-off screws also require through holes and tapped holes in the respective rings. However, these holes occupy a certain amount of space within the rings which becomes lost for the placement of the clamping screws.

In order to provide more space for the clamping screws, an auxiliary ring can be disposed between the front cone ring, i.e. the cone ring facing the heads of the clamping screws, and the web of the double cone ring as described in the German G M. At the points of the clamping screws, this auxilary ring has through-holes but is otherwise free of holes. Thus, the tapped pushing-off holes in the front cone ring are aligned with the points without holes in the auxiliary ring. By threading in the pushing-off screws, the front cone ring can be loosened and then, the auxiliary ring can be removed. Tapped holes are also provided at the points of the web of the double cone ring which line up with the points of the pushing-off holes in the front cone ring so that the pushing-off screws can be set at the same points and can now serve for pushing-off the rear cone ring. Thus, two sets of holes need no longer be provided side by side for pushing-off the front and rear cone rings so that space for one set is saved. It may also be said that with the same provision for tapped pushing-off holes, the number of pushing-off screws that can be used for each individual cone ring can be doubled.

However, in the known constructions, there are always tapped pushing-off holes next to the holes for the clamping screws. Thus, the number of clamping screws that can be accommodated is reduced. Since this number is decisive for the clamping force than can be generated and, therefore, for the torque that can be transmitted, the need for the tapped pushing-off holes is a serious limitation.

Accordingly, it is an object of the invention to provide a clamping arrangement which is able to maximize the space available for clamping screws.

It is another object of the invention to provide a clamping arrangement of relatively simple construction.

Briefly, the invention provides a clamping arrangement for clamping a pair of concentrically disposed parts together. The arrangement is comprised of a pair of elements which have tapered conical surfaces for locking against each other, clamping screws and a pair of rotatable rings which are disposed between the elements.

The clamping screws are disposed in an annular array and each screw passes through one of the elements into threaded engagement with the other element in order to clamp the elements together.

One rotatable ring is provided with a plurality of through bores and a plurality of abutment surfaces disposed in alternating manner. In addition, each bore is disposed coaxially of a screw for passage of the screw therethrough.

The second ring is disposed between the first ring and the element through which these screws pass. Further, this ring has a plurality of through bores and a plurality of tapped bores disposed on the same pitch circle in alternating manner with the through bores. Each through bore of this ring is disposed coaxially of a threaded screw for passage of the screw therethrough.

With the clamping screws unthreaded from the element in which they were previously threaded and from the two rings, the rings can be rotated to align the screws with the tapped bores in one ring and the abutment surfaces of the other ring in order to permit unclamping of the elements.

In the tightened state of the clamping arrangement, both rings are passed through by the clamping screws and provide practically no function. If the cone clamping arrangement is to be released, both rings are jointly turned so far that the regions between the through-bores come to lie at the points of the holes for the clamping screws and the two clamped elements. If the clamping screw holes are arranged at uniform angular spacings, the turning of the rings corresponds to one half such angular spacing. After turning of the rings, the clamping screw holes in the element through which the screws pass freely are lined up with the tapped holes in the second ring and the abutment surfaces in the first ring. If the clamping screws are then threaded in again, the second ring becomes braced against the back of the first element while the clamping screws press the abutted ring against the other element so as to displace the elements axially relative to each other. Thus, as many clamping screws as possible can be provided depending upon the space required by the heads of the screws without having to consider holes for pushing-off screws. On the other hand, as many pushing off screws can be employed as there are clamping screws. This may be necessary in the case of particularly tight fitting conical surfaces. The support of the pushing-off screws thus no longer takes place at the elements themselves but at the two auxiliary rings. It is of particular advantage if the clamping screws are used as the pushing-off screws.

The clamping arrangement is suitable for various types of structures, for example as described in German GM No. 76 17 275, German O.S. No. 20 17 149, German Pat. No. 11 90 266 and French Pat. No. 1 361 776. Of interest are clamping arrangements in which separate parts are provided for clamping a cylindrical hub on a cylindrical shaft as well as cone clamping arrangements in which the parts themselves have conical surfaces. Examples of the former are the constructions in German GM No. 76 17 275 and O.S. No. 20 17 149. Examples of the latter are shown in French Pat. No. 1,361,776.

The clamping arrangement can primarily be used for pushing apart two parts having cooperating (matching) conical surfaces. In addition, the clamping arrangement can be used with double cone clamping arrangements, for example as in German GM No. 76 17 275. In such a case, two pairs of auxiliary rings are provided on both sides of the web of the double cone ring between the rings and one of the outer cone rings.

The turning of the rings for a pushing-off operation presents no difficulties if the rings are accessible from the outside. The necessary turning can then be provided via a tool which engages, for instance, a radial hole or slot in the rings. If, however, the rings are not accessible from the outside, for example, in the case of a separate clamping arrangement interposed between a shaft and a hub bore, turning can be accomplished by providing a slot in one element. In this case, the slot receives one of the clamping screws and passes axially through the element as well as circumferentially over at least a length equal to twice the screw diameter and with a width corresponding to the screw diameter. A clamping screw or other pin shaped object can then be introduced from the clamping side into the through bores of the rings and then moved within the slot to cause a displacement of the rings in a circumferential direction so as to align the tapped holes of the second ring and the abutment surfaces of the first ring in front of the clamping screw holes in the elements.

The ring with the abutment surfaces may also be provided with a depression in at least one of the abutment surfaces in order to receive an end of a pushing-off screw during unclamping of the elements. This serves to prevent displacement of the ring in the circumferential direction when the screws are tightened for pushing off.

These and other objects and advantages of the invention will become more apparent from the following detailed description taken in conjunction with the accompanying drawings wherein:

FIG. 1 illustrates a cross-sectional view of a clamping arrangement according to the invention;

FIG. 2 illustrates a view taken on line II—II of FIG. 1;

FIG. 3 illustrates a view taken on line III—III of FIG. 2;

FIG. 4 illustrates a view taken on line IV—IV of FIG. 2;

FIG. 5 illustrates a partial cross-sectional view of a modified clamping arrangement according to the invention;

FIG. 6 illustrates a cross-sectional view of a further modified clamping arrangement according to the invention;

FIG. 7 illustrates a view taken on line VII—VII of FIG. 6; and

FIG. 8 illustrates a cross-sectional view of a further modified clamping arrangement according to the invention.

Referring to FIG. 1, the clamping arrangement serves to secure a flanged pulley 2 on a shaft 1. The flanged pulley 2 may support a larger drive wheel or may be a drive pulley of a friction screw press. As shown, the pulley 2 has a central hub 3 which has a cylindrical inside surface mounted on the outside circumferential surface of the shaft 1.

The hub 3 forms an inner element of the clamping arrangement and has a tapered conical surface 4 which is tapered towards the outside. In addition, the clamping arrangement has an outer element in the form of a conical ring 6 which has a tapered conical surface 5. This conical surface 5 has the same taper as the conical surface 4 and is adapted for locking against the conical surface 4 in a self-locking range.

Of note, the conical ring 6 is not slotted while the hub 3 may be slotted lengthwise in the conical region at least at one point.

If the conical ring 6 is displaced to the left, as viewed, relative to the hub 3, the hub 3 is compressed on the shaft 1, the forces being supplied by circumferential stresses in the conical ring 6. Thus, a torque can be transmitted from the shaft 1 to the pulley 2.

The displacement of the conical ring 6 is accomplished by means of clamping screws 7 each of which has a recessed head located within the pulley 2. Each screw 7 passes through a bore 8 in the pulley 2 and engages in a tapped hole 9 in the conical ring 6. As indicated in FIG. 2, a relatively large number of clamping screws 7 is arranged on a pitch circle about the axis of the shaft 1.

The clamping arrangement also employs two auxiliary rings 12, 13 between a backside 10 of the pulley 2 and a front side 11 of the conical ring 6. The rings 12, 13 have the same diameter and are provided axially one behind the other. At a points corresponding to the bores 8 in the pulley 2, the auxiliary rings 12, 13 have through bores 14, 15 (see FIG. 3) respectively, so that the clamping screws 7 can pass through the rings 12, 13. When the clamping arrangement is clamped, the auxiliary rings 12, 13 have no function as indicated in the top half of FIG. 1.

Referring to FIG. 4, the auxiliary ring 12 which is positioned between the ring 13 and the pulley 2 (facing the heads of the clamping screws 7) is provided with a plurality of tapped bores 16. These bores 16 are disposed on the same pitch circle as the through bores 14 in alternating manner with the through bores 14 (see FIG. 2). The tapped bores 16 also have the same circular pitch as the holes 8 but are arranged in offset relation between the holes 8. If the holes 8 are distributed uniformly, the tapped bores 16 are always exactly in the middle. However, if the holes 8 are unevenly distributed, the tapped bores 16 must have the same hole pattern only angularly offset by a given amount.

Referring to FIG. 4, the second auxiliary ring 13 is provided with a plurality of abutment surfaces 17 in alternating manner with the through bores 15. These abutment surfaces 17 are aligned with the tapped bores 16 in the auxiliary ring 12.

Referring to FIG. 1, in order to unclamp the pulley 2 and conical ring 6, the clamping screws 7 are unscrewed as indicated in the lower half of FIG. 1. However, the conical ring 6 is not yet released because of the self-locking feature of the conical surfaces 4, 5. Thus, after unthreading the clamping screws 7 from the conical ring 6 and the auxiliary rings 12, 13, the auxiliary rings 12, 13 are rotated by a small angular amount 18 as indicated in FIG. 2 so that the tapped bores 16 in the ring 12 and the abutment surfaces 17 in the ring 13 are aligned with the holes 8, 9 in the pulley 2 and conical ring 6. Turning can be accomplished using any simple suitable tool or manually. Thereafter, the same clamping screws 7 are again threaded in. However, at this time, the screws thread into the tapped bores 16 of the ring 12. Upon further threading, the ends of these screws 7 abut against the abutment surfaces 17 of the ring 13 as shown in FIG. 1. The auxiliary ring 12 then makes contact with the backside 10 of the pulley 2 and the ring 13 abuts the front side 11 of the conical ring 6. Further, threading of the screws 7 causes the rings 12, 13 and, thus, the conical ring 6 and pulley 2 to separate from each other.

Referring to FIG. 5, wherein like reference characters indicate like parts as above, the clamping screws 7 may be inverted relative to the pulley 2' and the conical ring 6'. In this case, the screws 7 pass through the conical ring 6' via through holes and engage in a tapped hole in the pulley 2'. In this case, the auxiliary rings 12, 13 must also be arranged in a reverse manner, i.e. the auxiliary ring 12 having the tapped bores 16 is arranged on the right hand side as shown in FIG. 5, i.e. the side facing the heads of the clamping screws 7.

Referring to FIGS. 6 and 7, wherein like reference characters indicate like parts as above, the elements carrying the conical surfaces may be separate from the parts to be connected together. For example as shown, the clamping arrangement is constructed so as to clamp a shaft 1 and a hub 19 together.

As shown, the flange 22 which is mounted on the hub 3 and corresponds to the flanged pulley 2 of FIGS. 1 to 5 has a diameter corresponding to a bore 20 of the hub 19 so as to center the shaft 1 in the hub bore 20. The conical ring 6 of the clamping arrangement is located with a cylindrical outside circumferential surface 21 in the hub bore 20 and establishes a frictional connection between the shaft 1 and the hub 19. The hub 3 and/or the conical ring 6 may be slotted.

The arrangement and operation of the auxiliary rings 12, 6 are the same as described with respect to FIGS. 1 to 4. As indicated in the lower part of FIG. 6, the auxiliary ring 13 is provided with a depression 23 within an abutment surface. This depression 23 receives an end of a clamping screw 7 during unclamping of the elements 3, 6 and prevents the auxiliary ring 13 from rotating circumferentially when the screws 7 are tightened. It is sufficient if a depression 23 is provided at the point of only one screw 7.

Whereas the auxiliary rings 12, 13 of FIGS. 1 to 5 are accessible from the outside and can be readily rotated, this is not the case with the clamping arrangement of FIG. 6. As indicated, the clamping arrangement is accessible only from the left hand side as viewed. Thus, in order to effect the necessary rotation of the auxiliary rings 12, 13, a slot 24 (see FIG. 7) is formed in the flange 22. This slot 24 receives one of the clamping screws 7 and passes axially through the flange 22 while at the same time extending circumferentially at least over a length equal to twice the screw diameter and with a width corresponding to the screw diameter. Preferably, the slot 24 extends beyond the plane of the tapped bore 16 in the adjacent auxiliary ring 12.

After the clamping screws 7 have been unthreaded from the conical ring 6 and removed from the auxiliary rings 12, 13, a clamping screw can be inserted into the slot 24 and into the aligned through bores 14, 15 of the auxiliary rings 12, 13. The rings 12, 13 can then be turned angularly via the clamping screw while the screw moves within the slot 24. When the tapped bore 16 of the auxiliary ring 12 becomes aligned with a hole 8 in the flange 22, a clamping screw can be threaded into the tapped hole 16 through the hole 8 as indicated in FIG. 6 for pushing off the conical ring 6. Additional clamping screws may also be threaded into the tapped bores 16 since these also coincide with the holes 8 in the flange 22.

Referring to FIG. 8, wherein like reference characters indicate like parts as above, the clamping arrangement may employ two elements in the form of conical rings 25, 26. As shown, one conical ring 25 is seated on the shaft 1 via a cylindrical inside surface and has stepped conical surfaces 27' 27". The step is located approximately in the middle of the longitudinal extent of the conical ring 25. The outer conical ring 26 has a cylindrical outside surface which contacts the hub bore 20 as well as stepped conical surfaces 28' 28". In addition, a pair of auxiliary rings 12, 13 are accommodated in a space between end faces 29, 30, respectively, of the conical rings 25, 26. The function of these rings 12, 13 is the same as described above. In order to turn the rings 12, 13, at least one slot 24 can be provided in the conical ring 26 starting from at least one of the holes 8 in the conical ring 26.

The auxiliary rings 12, 13 can be used in the same manner if both parts to be connected carry conical surfaces, for example, if a wheel disc provided with a conical hole is to be mounted on a conical shaft end. The rings may also be used in a double cone clamping arrangement with a double cone ring and two conical rings which are to be drawn against each other onto the double cone ring. If a web is provided at the double cone ring between the conical rings, a pair of auxiliary rings each must be provided on both sides of the web. Further, the auxiliary ring 12 having the tapped holes 16 must always be arranged toward the side with the heads of the clamping screws.

What is claimed is:
1. A clamping arrangement for clamping a pair of concentrically disposed parts together, said arrangement comprising an inner element having a tapered conical surface;
an outer element having a tapered conical surface for locking against said conical surface of said inner element;
a plurality of clamping screws disposed in an annular array, each said screw passing through one of said elements into threaded engagement with the other of said elements to clamp said elements together;
a first rotatable ring disposed between said elements with a plurality of through bores and a plurality of abutment surfaces disposed in alternating manner, each said bore being disposed coaxially of a respective screw for passage of said screws therethrough; and
a second rotatable ring disposed between said first ring and said one element, said second ring having a plurality of through bores disposed on a pitch circle and a plurality of tapped bores disposed on said pitch circle in alternating manner with said through bores, each said through bore of said second ring being disposed coaxially of a threaded screw for passage of said screw therethrough whereby with said screws withdrawn from said other element and said rings, said rings can be rotated to align said screws with said tapped bores and said abutment surfaces to permit unclamping of said elements.

2. A clamping arrangement as set forth in claim 1 wherein said one element includes a slot receiving one of said screws therein and passing axially through said one element and circumferentially at least over a length equal to twice a screw diameter and with a width corresponding to said screw diameter.

3. A clamping arrangement as set forth in claim 1 wherein said first ring has at least one depression in a respective abutment surface to receive an end of a screw therein during unclamping of said elements.

4. A clamping arrangement as set forth in claim 1 wherein one of said elements has a slotted conical surface.

5. A clamping arrangement as set forth in claim 1 wherein one of said elements is a hub for mounting on a shaft.

6. In combination
a first part;
a second part concentrically mounted on said first part;
an inner element between said parts and having a tapered conical surface;
an outer element between said parts and having a tapered conical surface for locking against said conical surface of said inner element;
a plurality of clamping screws disposed in an annular array, each said screw passing through one of said elements into threaded engagement with the other of said elements to clamp said elements together;
a first rotatable ring disposed between said elements with a plurality of through bores and a plurality of abutment surfaces disposed in alternating manner, each said bore being disposed coaxially of a respective screw for passage of said screw therethrough; and
a second rotatable ring disposed between said first ring and said one element, said second ring having a plurality of through bores disposed on a pitch circle and a plurality of tapped bores disposed on said pitch circle in alternating manner with said through bores, each said through bore of said second ring being disposed coaxially of a threaded screw for passage of said screw therethrough.

7. The combination as set forth in claim 6 wherein said first part is a shaft.

8. The combination as set forth in claim 7 wherein said second part is a hub and said inner element is integral therewith.

* * * * *